Patented Jan. 30, 1923.

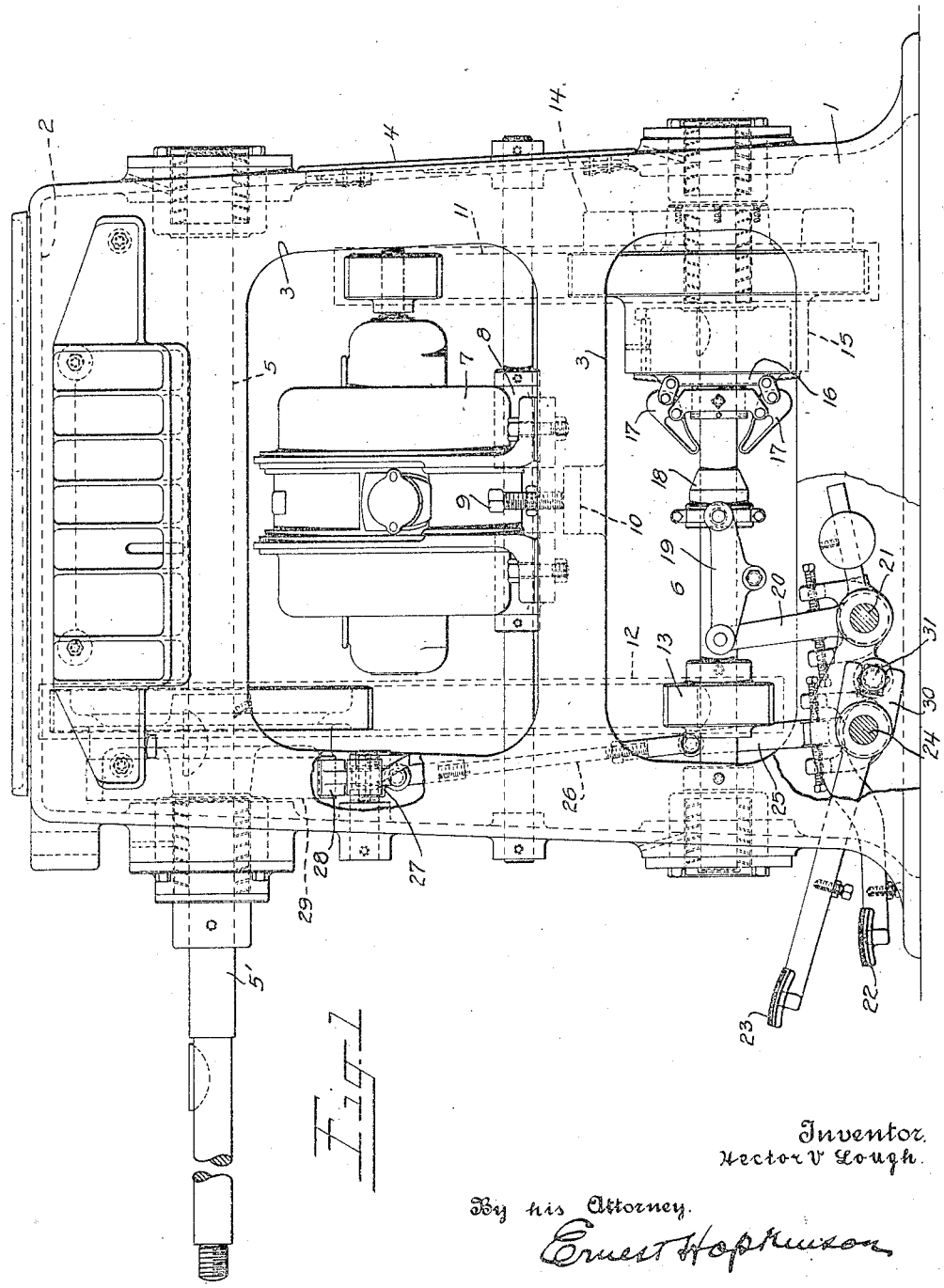

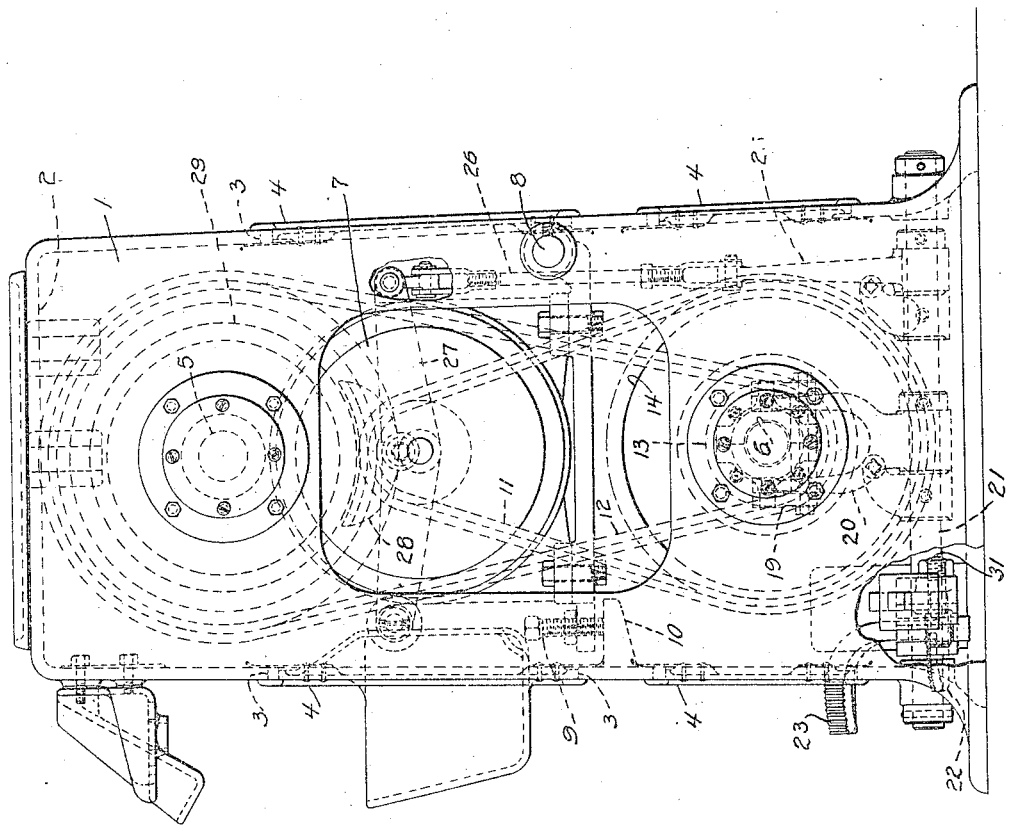

1,443,369

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

TIRE-BUILDING MACHINE.

Application filed October 16, 1920. Serial No. 417,411.

*To all whom it may concern:*

Be it known that I, HECTOR V. LOUGH, a subject of the King of Great Britain, residing at Hartford, county of Hartford, and State of Connecticut have invented certain new and useful Improvements in Tire-Building Machines, of which the following is a full, clear, and exact description.

Tires are manufactured in various ways. One method in extensive use is to build up an endless cylindrical band of superimposed layers of fabric and rubber, which band is subsequently roughly shaped to form by distension, intermediately while its edges are drawn together. In this method it is desirable to build the cylindrical band or carcass on a collapsible drum. The present invention relates to a machine for supporting and actuating such a drum.

Tire building machines of the type mentioned have heretofore been constructed with a main-shaft, which is adapted to carry the drum, supported in a frame, and driven by a second and right-angularly disposed shaft which is belted outside of the frame of the machine to a suitable source of power such as a counter shaft on the ceiling of a room or building. The external shafting is in the way, unduly obstructs movement about the room, and is a dangerous menace to employees. The present invention aims to provide a unitary tire building machine that is complete within itself, i. e., it carries or contains its own motor or source of power as well as driving connections to the main-shaft or the building drum. The driving connections between the motor and drum are compactly arranged within the machine to economize floor space. The motor and mechanical elements are housed within the frame to protect them from dust as well as to allow free circulation of air about the motor, facilitating dissipation of heat during operation thereof. Still further, it aims to diminish vibration by augmenting the weight of the frame and constituent instrumentalities with the weight of the driving motor, the building drum on the outside of the frame being balanced in part at least by the motor on the inside of the frame. Generally, the invention contemplates a more efficient, reliable, and durable machine of the tire building type.

The invention is illustrated in the accompanying drawings, in which—

Figures 1 and 2 are side and end elevations respectively of a machine embodying the principles of the invention, parts of the frame being broken away to more fully disclose the construction.

In the machine illustrated in the drawings, the frame 1 as shown is of a hollow box-like form with its top 2 closed or covered over by metal integral with its side walls. More or less rectangular openings 3 filled by suitable cover plates, one of which is indicated in the end walls at 4, are provided to completely enclose and protect the parts within the frame from dust while allowing access thereto when necessary. A main-shaft 5 and jack-shaft 6 are suitably supported in bearings in opposite side walls of the frame in the upper and lower portions respectively thereof, the main-shaft 5 having a free end 5' projecting outside of the frame and adapted to receive a collapsible drum (not shown) such as disclosed in a patent to Ernest Hopkinson, No. 1,310,701, granted July 22, 1919.

The main- and jack-shafts 5 and 6 are preferably arranged in parallelism and intermediate these shafts and preferably with its axis in a vertical plane with their axes is arranged a motor indicated generally by the numeral 7. The motor is housed within the frame and at one side hinged as indicated at 8, while on its other side its base is provided with an adjustable supporting screw 9 adapted to rest upon a lug 10 integral with or otherwise fixed to the opposite side of the frame of the machine. Flexible connections such as chains 11 and 12 operatively connect the jack-shaft with the motor and the main-shaft respectively, the chain 12 being connected to a gear 13 on one end of the jack-shaft and the chain 11 being connected to a combined fly wheel and gear 14. The combined gear and fly wheel 14 is formed integral with or otherwise suitably connected to the driving member 15 of any well known type of a friction clutch whose driven member 16 is slidably supported on the jack-shaft and adapted to be operated through toggles 17 and a shiftable conical-ended collar 18 which is linked as indicated at 19 to an arm 20 on a rod 21 that carries a foot treadle 22 conveniently disposed for governing the operation of the clutch.

A second foot treadle 23, on a shaft 24 having an arm 25 linked as indicated at 26 to a brake lever 27 which carries a shoe 28 adapted to engage a brake wheel 29 fast on the main shaft 5, is interoperatively connected to the first mentioned foot lever 22 by a slotted arm 30 and pin 31 connected to each of the levers as clearly shown in Fig. 1. Depression of the treadle 22 shifts the collar 18 and disengages the driving members of the clutch, and at the same time applies the brake, incidentally lifting the second treadle 23. On the other hand, depression of the treadle 23 throws the brake off and engages the clutch parts to start rotation of the main-shaft 5. Through the pin and slot connections 30—31, the treadles are thus rendered effective only in alternation.

Having thus described my invention, what I claim and desire to protect by Letters Patent is:—

1. A unitary tire building machine having in combination, a hollow frame adapted to rest on the floor of a building, a main-shaft rotatably supported in the upper portion of the frame and having a free projecting end adapted to carry a drum on which tires may be built up, a motor housed within the frame, and driving connections between said motor and main-shaft including a manually operable clutch.

2. A unitary tire building machine having in combination, a hollow frame with a closed top and a downwardly open supporting base, a main-shaft rotatably supported in the upper portion of the frame and below its top, said main-shaft having a free projecting end adapted to carry a building drum, a motor housed within and supported by the frame below said main-shaft, a jack-shaft located below the motor, flexible driving connections between the motor and jack-shaft and between the jack- and main-shafts, and means for coupling and uncoupling the main-shaft from driving relation with the motor.

3. A unitary tire building machine having in combination, a hollow frame, main- and jack-shafts operatively supported in the upper and lower portions of the frame respectively, a motor supported by and within the outline of the frame intermediate said shafts, a clutch on said jack-shaft having driving and driven members fixed and shiftable respectively on said jack-shaft, a fly wheel fixedly secured to said driving member of the clutch, flexible driving connections between the driving member and motor and between the jack- and main-shafts, and means also supported by the frame for governing the operation of the clutch.

4. A unitary tire building machine having in combination, a hollow frame, main- and jack-shafts operatively supported in the upper and lower portions of the frame respectively, a motor supported by and within the outline of the frame intermediate said shafts, a clutch on said jack-shaft having driving and driven members fixed and shiftable respectively on said jack-shaft, a fly wheel fixedly secured to said driving member of the clutch, flexible driving connections between the driving member and motor and between the jack- and main-shafts, and means also supported by the frame for governing the operation of the clutch, the axes of said main- and jack-shafts and of the motor being substantially in the same vertical plane.

5. A unitary tire building machine having in combination, a hollow frame closed at the top, main- and jack-shafts operatively supported in the upper and lower portions of the frame, respectively, a motor supported by and within the outlines of the frame intermediate said shafts, a clutch on said jack-shaft having driving and driven members fixed and shiftable respectively to and on said jack-shaft, a combined fly wheel and gear fixedly secured to said driving member of the clutch, flexible connections between the combined fly wheel and gear and the motor and between the jack- and main-shafts, a brake for retarding rotation of said main-shaft, and interlocking treadles supported by the frame for governing the operation of the clutch and brake respectively, said treadles being operative only in alternation whereby when the clutch is uncoupled the brake is applied and when the brake is released the clutch is coupled.

6. A unitary tire building machine having in combination, a hollow frame, a shaft rotatably supported in the upper portion of the frame and having a free projecting end adapted to receive a drum externally of the frame, a motor housed within the frame, driving connections between the motor and the shaft also housed within the frame and including a clutch having driving and driven members, accessible means for governing the operation of the clutch, and a fly wheel fixedly secured to the driving member of the clutch.

7. A unitary tire building machine having in combination, a hollow frame, a shaft rotatably supported in the upper portion of the frame and having a free projecting end adapted to receive a drum externally of the frame, a motor housed within the frame, driving connections between the motor and the shaft also housed within the frame and including a clutch having driving and driven members, accessible means for governing the operation of the clutch, a combined gear and fly wheel secured to the driving member of the clutch, and a chain operatively connecting said motor and combined gear and fly wheel.

Signed at Hartford, county of Hartford, and State of Connecticut, this 11th day of October, 1920.

HECTOR V. LOUGH.